United States Patent
Dumoulin et al.

(10) Patent No.: US 10,901,716 B2
(45) Date of Patent: Jan. 26, 2021

(54) IMPLICIT FILE CREATION IN APDU SCRIPTS

(71) Applicant: IDEMIA FRANCE, Colombes (FR)

(72) Inventors: Jerome Dumoulin, Colombes (FR); Tomasz Wozniak, Colombes (FR)

(73) Assignee: IDEMIA FRANCE, Colombes (FR)

(*) Notice: Subject to any disclaimer, the term of this patent is extended or adjusted under 35 U.S.C. 154(b) by 620 days.

(21) Appl. No.: 15/528,658

(22) PCT Filed: Nov. 23, 2015

(86) PCT No.: PCT/EP2015/077309
§ 371 (c)(1),
(2) Date: May 22, 2017

(87) PCT Pub. No.: WO2016/083282
PCT Pub. Date: Jun. 2, 2016

(65) Prior Publication Data
US 2017/0269918 A1    Sep. 21, 2017

(30) Foreign Application Priority Data

Nov. 24, 2014 (EP) .................................. 14306865

(51) Int. Cl.
*G06F 8/61* (2018.01)
*G06F 16/16* (2019.01)
(Continued)

(52) U.S. Cl.
CPC ................ *G06F 8/61* (2013.01); *G06F 16/16* (2019.01); *G06F 21/6209* (2013.01);
(Continued)

(58) Field of Classification Search
CPC ........ G06F 8/61; G06F 16/16; G06F 21/6209; G06F 21/72; H04W 12/0023;
(Continued)

(56) References Cited

U.S. PATENT DOCUMENTS 6,402,028 B1* 6/2002 Graham, Jr. ......... G06Q 20/341
235/380
2003/0088691 A1* 5/2003 Audebert ........... G06Q 20/3674
709/237

(Continued)

FOREIGN PATENT DOCUMENTS

EP    1 605 415 A1    12/2005
EP    2 447 835 A1    5/2012

OTHER PUBLICATIONS

Wikipedia, "Universal Integrated Circuit Card," 2014 [retrieved on Feb. 2, 2020], downloaded from the Wayback Machine Internet Archive at <url>:https://web.archive.org/web/20140608073747/ https://en.wikipedia.org/wiki/Universal_integrated_circuit_card. (Year: 2014).*

(Continued)

*Primary Examiner* — S. Sough
*Assistant Examiner* — Stephen D Berman
(74) *Attorney, Agent, or Firm* — Nixon & Vanderhye

(57) ABSTRACT

A secure element (30) has a local store of file property data (50). A method of preparing a script to send to the secure element (30) to remotely provision a profile (31) at the secure element includes preparing the script such that the script lacks a command to create a file if the local store of file property data (50) at the secure element includes file property data which can be used to locally create that file. A script may include an entry of reduced length which refers to the file to be locally created, such as a SELECT FILE command and an identifier of the file.

8 Claims, 8 Drawing Sheets

(51) Int. Cl.
G06F 21/72 (2013.01)
G06Q 20/34 (2012.01)
G07F 7/10 (2006.01)
H04W 12/04 (2009.01)
H04W 12/00 (2009.01)
G06F 21/62 (2013.01)

(52) U.S. Cl.
CPC ............ *G06F 21/72* (2013.01); *G06Q 20/341* (2013.01); *G06Q 20/3552* (2013.01); *G07F 7/1008* (2013.01); *H04W 12/0023* (2019.01); *H04W 12/04* (2013.01)

(58) Field of Classification Search
CPC . H04W 12/04; G06Q 20/341; G06Q 20/3552; G07F 7/1008
See application file for complete search history.

(56) References Cited

U.S. PATENT DOCUMENTS

2012/0160922 A1  6/2012  Cau et al.
2016/0086184 A1* 3/2016  Carpenter .......... G06Q 20/4016
                                           705/44

OTHER PUBLICATIONS

Park et al. "Secure Profile Provisioning Architecture for Embedded UICC," 2013 [retrieved on Sep. 29, 2020], 2013 International Conference on Availability, Reliability and Security, pp. 297-303, downloaded from the Internet at <url>:https://ieeexplore.ieee.org. (Year: 2013).*

International Search Report, dated Jan. 22, 2016, from corresponding PCT application.

* cited by examiner

FP table

| FID | Parameters |
|---|---|
| 2F06 | 000127001100103F0010000000000000000000000000000000010000000000000000000000000400100000 |
| 220D | FF0028000A0015 2F0601060000000000000000000000000000000002F06010200000000000000000000000 |
| 220F | FF00230005000422F010000000000000000000000000000000002F060102000000000000000005800172F9000000000 |

Fig. 6

FP table

| FID | Parameters | Service# |
|---|---|---|
| 2F06 | 0001270011001 03F001000000000000000000000000000000000000000000000000000000002F0601020000000000000000000004000100000 | 0 |
| 220D | FF0028000A001 S2F0601060000000000000000000000000000000002F06010100000000000000000058001 72F90000000 | 0 |
| 220F | FF00230005000 422F01000000000000000000000000000000000000000000000000000000002F06010400000000000000000000000000 | 0 |
| **** | ********** | 1 |
| **** | ********** | 2 |
| **** | ********** | 3 |
| **** | ********** | 4 |

Fig. 8

IMPLICIT FILE CREATION IN APDU SCRIPTS

BACKGROUND

There is an increasing interest in machine-to-machine (M2M) communications in which a machine communicates with another machine via a communications network. M2M devices can be provided with an embedded Universal Integrated Circuit Card (eUICC). The eUICC performs similar functions to those performed by a Subscriber Identity Module (SIM) card in a personal wireless device. The eUICC, however, is not so easy to remove as it is embedded in the device, being soldered, for example, onto a circuit board of the device.

An architecture is being developed for the remote provisioning and management of Embedded UICC devices. One standards body active in this area is the GSM Association (GSMA) "Remote Provisioning Architecture for Embedded UICC, Technical Specification". An early version of this specification is Version 2.0, dated 13 Oct. 2014.

Part of the process for provisioning an eUICC device is to install a profile on the device. The profile provides the device with functionality to access a specific mobile network infrastructure. The profile can comprise a file structure, data and applications. The profile can be remotely provisioned on the eUICC.

Once an eUICC is in its "use phase" all communication between the eUICC and the outside world takes place via ISO 7816 APDU Commands. The eUICC receives an APDU and returns a response. The European Telecommunications Standards Institute (ETSI) Technical Specification TS 102 226, "Remote APDU structure for UICC based applications", defines protocols that allow remote entities to send a script to a UICC. The script contains a series of APDU commands, the script is addressed to an application on the card, referred to in the ETSI specification as a "remote management application".

In the context of remote provisioning, a profile is created when a remote management application on the card executes the commands in a "provisioning script". An eUICC may store multiple profiles, such as a profile per type of access network (GSM, CDMA). Also, a profile may be updated or a new profile downloaded when an owner of the wireless device wants to use a different access network operator to provide the access network for that wireless device.

As the number of profiles and their complexity increases, the scripts to create them become progressively larger.

SUMMARY

An aspect of the invention provides a method of preparing a script to send to a secure element to remotely provision a profile at a secure element, wherein the secure element has a local store of file property data, the method comprising preparing the script such that the script lacks a command to create a file if the local store of file property data at the secure element includes file property data which can be used to locally create that file.

The method can be performed to create or generate a script for sending to a secure element, such as creating a script from a specification file. Alternatively, the method can be performed to process or "filter" an existing script. By processing the existing script, the method can reduce the length of the script.

The script may comprise an entry which identifies the file to be locally created at the secure element. The entry can have a shorter length than an entry which includes a create file command. For example, an entry with a create file command also needs to specify various parameters to create the file.

The method may comprise: receiving a first script which comprises a first entry which comprises a command to create a file; determining if the first entry in the script corresponds to a file whose file properties are stored in the local store of file property data at the secure element; if the first entry corresponds to the file whose file properties are stored, replacing the first entry in the script with a second entry in the script, wherein the second entry is shorter than the first entry and lacks the command to create the file; and outputting a modified script of shorter length than the first script.

The first entry may comprise a create file command, a file identifier and file properties and the second entry may comprise the file identifier. The second entry does not need to specify all, or any, of the file properties.

The second entry may comprise a select file command.

Another aspect of the invention provides a method of provisioning a profile at a secure element comprising:
  receiving a script to provision the profile;
  executing the script to provision the profile, wherein the executing comprises:
  reading an entry in the script which refers to a file;
  determining if the file exists; and, if the file does not exist,
    creating the file using a local store of file property data at the secure element.

The entry in the script may comprises a file identifier and the method comprises: using the file identifier to locate file property data in the local store; and creating the file with the identifier and the file property data.

The entry in the script may comprise a select file command.

Another aspect of the invention provides a method of provisioning a profile at a secure element comprising:
  receiving a script to provision the profile and
  executing the script to provision the profile;
the method further comprising, in advance of executing the script, creating at least one file required by the profile using a local store of file property data at the secure element, and wherein the received script lacks a command to create the at least one file.

The entry in the script may comprise a select file command and a file identifier and the file created in advance of execution of the script may comprise the same file identifier.

Creating at least one file required by the profile may comprise creating at least one mandatory file.

The method may further comprise receiving a service table indicating at least one service required by the profile, and wherein the local store of file property data includes an indication of a service that the file property data is associated with, and the method comprises:
  using the service table to identify a service required for the profile;
  retrieving file property data from the local store of file property data for each required service; and
  creating at least one file for the required service using the retrieved file property data.

The file property data may comprise at least one of: a file identifier; file size, file access rights.

The file property data may be stored in a single data structure which stores file property data for mandatory files and optional files. The data structure may be indexed according to service number. For example, mandatory files may be identified by a service number=0 or a negative number, and optional files by a service number≥1.

The secure element may be an embedded Universal Integrated Circuit Card.

The commands in the script may conform to ISO 7816. The methods performed at the secure element are considered to be alternative solutions to a particular technical problem.

An advantage of at least one embodiment is that the size of the script can be reduced. An advantage of at least one embodiment is that the size of the script can be reduced while maintaining conformity with existing commands used over an interface to the device. For example, the script can still conform to ISO 7816 because it still uses ISO 7816 APDU commands.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described or claimed methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

Another aspect of the invention provides a secure element comprising a processor and a memory, the memory containing instructions executable by the processor, whereby the processor is configured to perform the functionality described or claimed in respect of the secure element.

Another aspect of the invention provides apparatus for use in preparing a script, the apparatus comprising a processor and a memory, the memory containing instructions executable by the processor, whereby the processor is configured to perform the described or claimed server-side functionality.

BRIEF DESCRIPTION OF THE DRAWINGS

Embodiments of the invention will be described, by way of example only, with reference to the accompanying drawings in which:

FIG. 3 shows an extract of an example of a conventional script for provisioning a profile at an eUICC;

FIG. 4 shows an extract of an example of a modified script for provisioning a profile at an eUICC;

FIG. 6 shows an example of a file properties table used by the management application;

FIG. 8 shows another example of a file properties table used by the management application;

DETAILED DESCRIPTION

Figure 1:
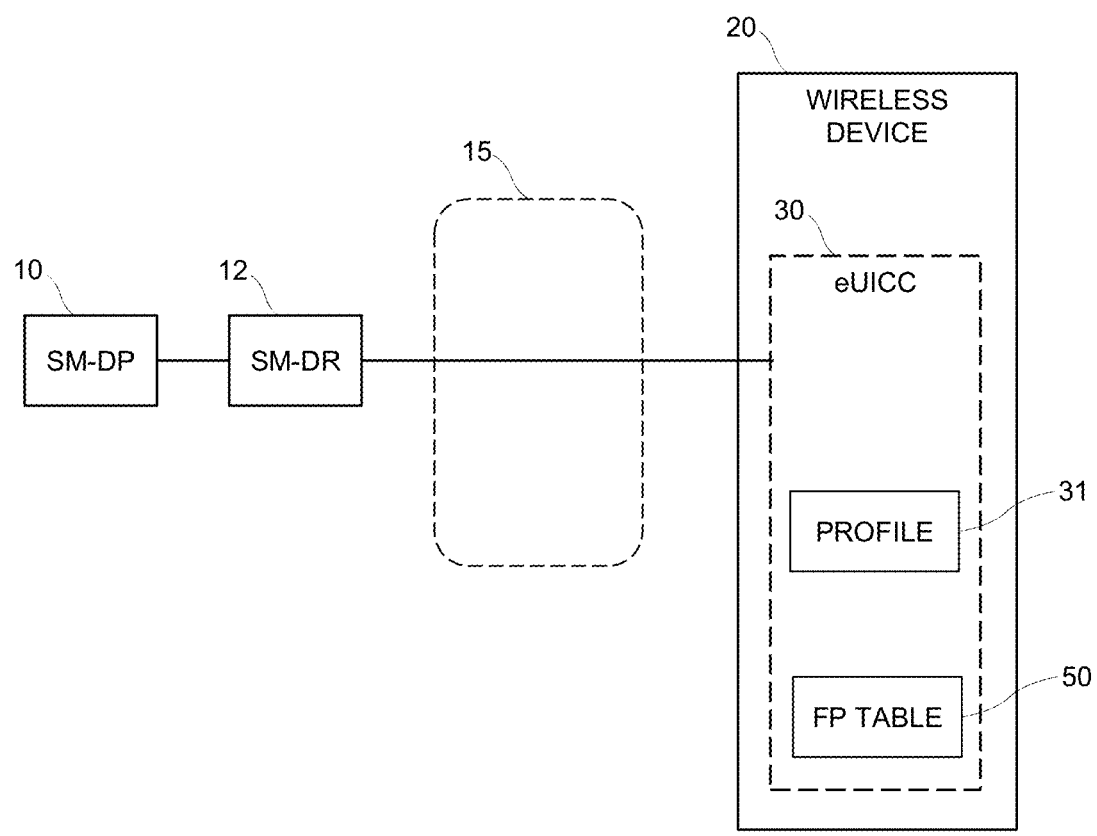
FIG. 1 shows an architecture for provisioning and management of an embedded Universal Integrated Circuit Card (eUICC)

FIG. 1 shows an architecture for provisioning and management of an embedded Universal Integrated Circuit Card (eUICC) 30 hosted by a wireless device 20. Examples of the wireless device 20 are a machine-to-machine (M2M) device and a mobile device, such as a smart phone, mobile phone, dongle or other wireless device which can communicate via a wireless network. Device 20 uses at least one wireless access network, such as a 2G, 3G or 4G network. The eUICC 30 is a self-contained computer on a chip with a processor and storage. The eUICC 30 provides a secure environment in which to perform certain tasks, such as establishing secure communication with the access network.

The eUICC 30 can be remotely provisioned with a profile. The profile provides the device with functionality to access a specific mobile network infrastructure. The profile can comprise a file structure, data and applications. Network entities participating in the provisioning process include a Subscription Manager Data Preparation (SM-DP) entity 10 and a Subscription Manager Secure Routing (SM-SR) entity 12. The SM-DP 10 prepares the profiles and manages the secure download and installation of the profiles on the eUICC 30. The SM-SR 12 securely performs functions of platform management commands and the transport of profile management commands. A communication network 15 is used to access the device 30 for provisioning purposes. An eUICC may store multiple profiles 31. The eUICC 30 can also store a File Properties (FP) table 50. As described in more detail later, the File Properties table 50 is used when provisioning a profile. The File Properties table 50 can be used as shared resource by the eUICC when provisioning one or more profiles 31.

The store of file property data 50 can be transferred to the eUICC 30 during manufacture of the eUICC, or during pre-issuance of the eUICC or host device 20 into which the eUICC is embedded.

Figure 2:
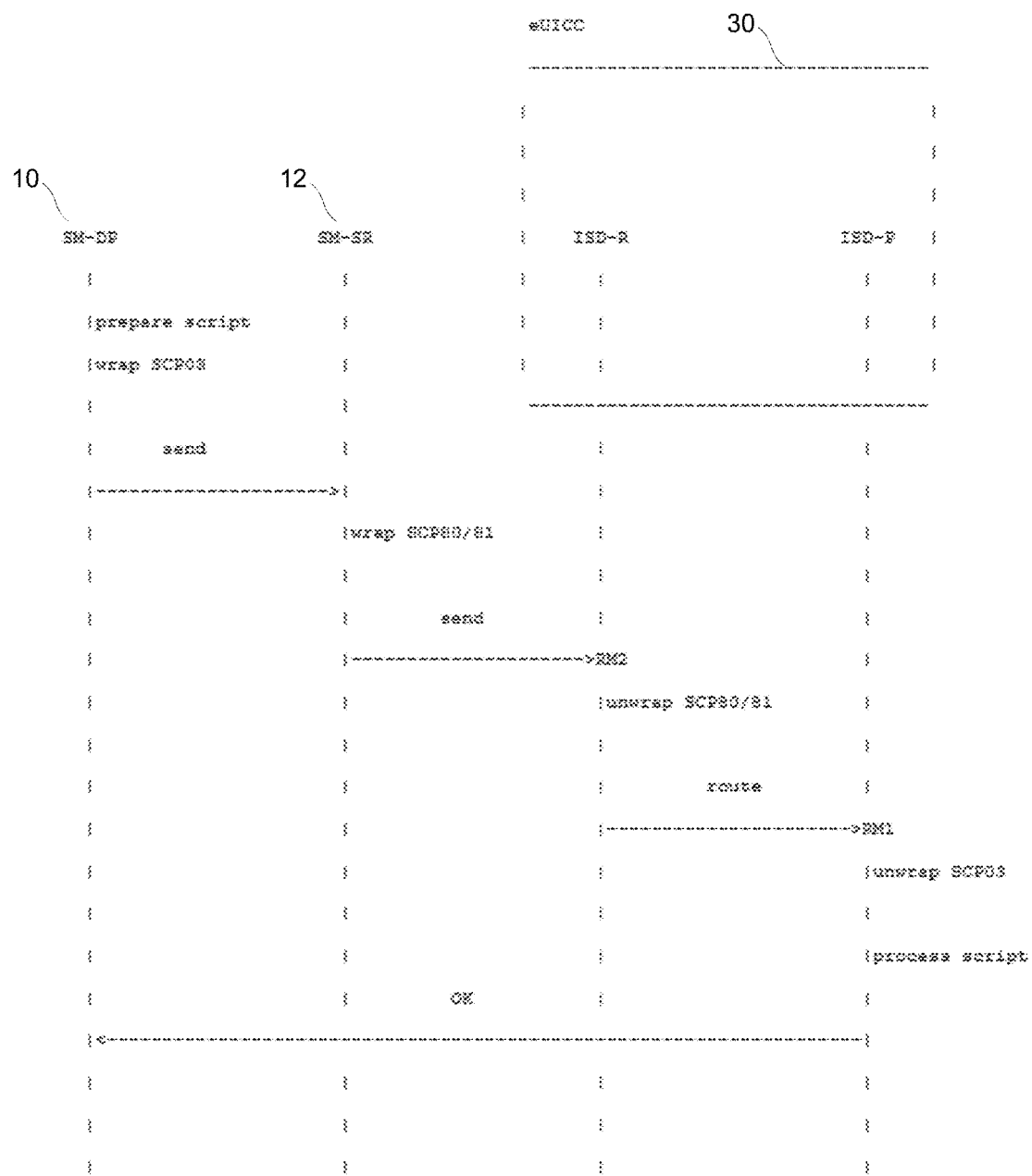
FIG. 2 shows an example of remotely provisioning a profile on an eUICC.

FIG. 2 shows an example of remotely provisioning a profile on an eUICC 30. In the context of remote provisioning, a profile is created when a remote management application on the card executes the commands in a provisioning script. The SM-DP 10 prepares a script. The script is encrypted according to a standard protocol, such as SCP03, and addressed to a remote management application, RM1, on the eUICC 30. RM1 runs in a secure environment, Issuer Security Domain-Profile (ISD-P), that is controlled by the entity that controls the profile, which will usually be a mobile network operator. There is a shared SCP03 key on the eUICC 30 and the SM-DP 10 that will already have been put in place by the mobile network operator before any script can be addressed to RM1. When RM1 receives a script, it decrypts it and executes the commands contained in the script, which creates a profile.

The script is routed via the SM-SR 12. The SM-SR 12 receives an encrypted script from the SM-DP 10, encrypts the script according to a standard protocol, e.g. SCP80 or SCP81, and addresses it to RM2. RM2 runs in a secure environment, Issuer Security Domain-Root (ISD-R), that is generally controlled by the issuer of the eUICC 30. There is a shared SCP80/SCP81 key on the eUICC 30 and the SM-SR 12 that will have been put in place by the card issuer before any script can be addressed to RM2. When RM2 receives a script, it decrypts is and forwards it to RM1.

FIG. 3 shows a short extract of an example of a conventional script 40. The conventional script 40 includes entries 41, 42, 43 which instruct the eUICC to create a file. The entries comprise a "CREATE FILE" command, an identifier of the file to be created, and properties/parameters for the file creation.

FIG. 4 shows a short extract of an example of a modified script 45. In the modified script 45, the entries 41, 42, 43 have been replaced with shorter entries 46, 47, 48. The shorter entries 46, 47, 48 instruct the eUICC to select a file. Each entry 46, 47, 48 includes an identifier of the file to be selected. For example, entry 46 instructs the eUICC to select a file with the identifier 2F06. One advantageous form of the shorter entries 46, 47, 48 consists of a SELECT FILE command and an identifier of the file, and does not specify any file properties. The modified script 45 is shorter than the conventional script 40 because the entries 41, 42, 43 have been replaced with shorter entries 46, 47, 48. The reduction in size has been achieved in a manner which is compatible with a conventional script. For example, the modified script 45 uses conventional APDU (ISO 7816) commands in the places where it has been modified. The reduction in size is possible because the eUICC has a local store 50 of file property data which allows the eUICC to create the required file. Other entries in the script following an entry 46, 47, 48 may specify data to populate a file. The data can be specified in one or more "UPDATE RECORD" entries of the script.

Advantageously, the modified script includes a header which indicates that the script is a modified script. This allows the eUICC 30 to process the script in an appropriate manner.

Figure 5:
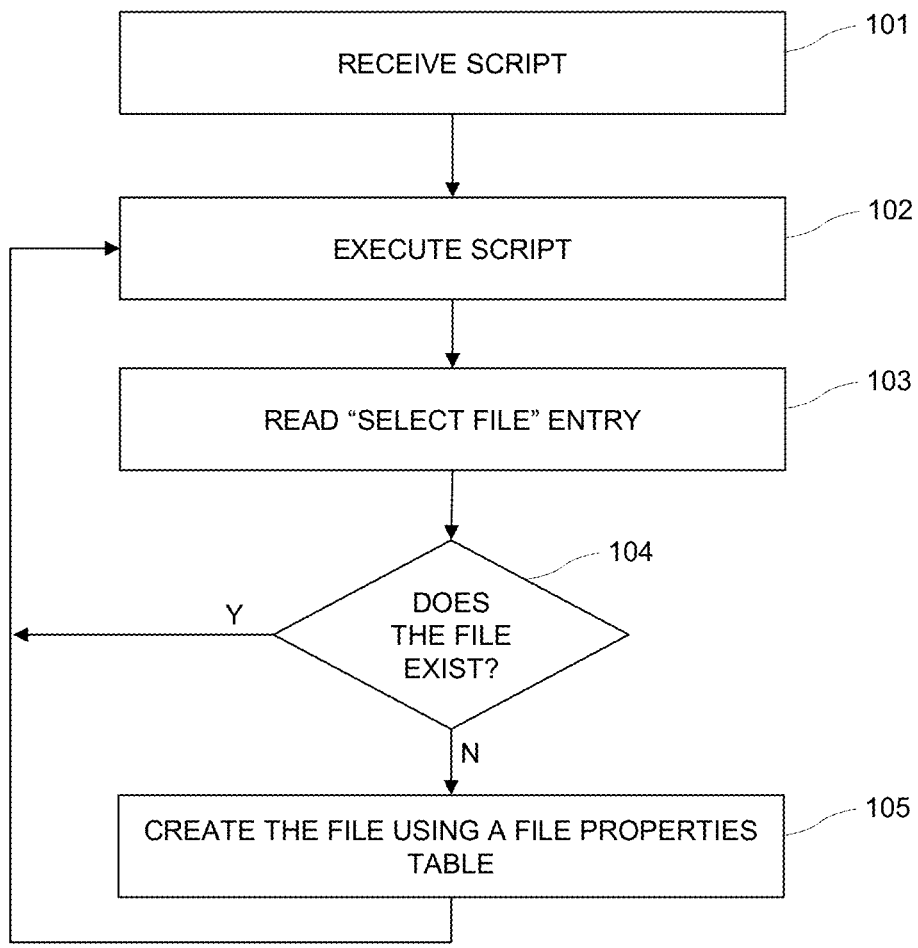
FIG. 5 shows an example of a method performed by a management application at an eUICC.

The management application at the eUICC can operate in one of several possible ways in accordance with the modified script 45. A first example of operation of the management application at the eUICC will now be described with reference to FIG. 5. At block 101 a script is received at the eUICC 30. The script can be of the form of script 45 shown in FIG. 4. At block 102 the script is executed line-by-line. At block 103 the management application reaches an entry in the script which includes a SELECT FILE command and a reference to a file. For example, the SELECT FILE command may identify the file to be selected, as in the example entries 46, 47, 48 of FIG. 4. Block 104 checks if the file specified in the SELECT FILE command exists. If the file does exist, the method can proceed as normal, and execution continues. If the file does not exist, the method proceeds to block 105 and generates and executes a CREATE FILE command to create the required file at block 104. Block 105 uses the locally stored File Properties (FP) table (50, FIG. 1) which includes parameters to be used when creating the files. The FP table 50 can include, for example, file identity, access rights, and size.

FIG. 6 shows an example FP table 50 for use with the modified script 45 of FIG. 4. Each entry 51, 52, 53 in the table 50 corresponds to a file to be created. Referring again to the script of FIG. 4, consider the management application reads entry 46 in the script 45 and file 2F06 does not yet exist. The management application uses entry 51 in the table 50 (with the corresponding identifier 2F06) to create the required file. Entry 51 has the parameters to be used when creating the file. The following list gives possible file creation parameters:
  File Type
  File ID
  Dedicated File (DF) Name (Application Identifier (AID)) for ADF creation
  Life Cycle
  Remote Access Condition
  Total File Size
  Access Condition
  Proprietary Application data
  Fill pattern Files are created with a fixed length and are initialized with the fill pattern. The fill pattern is a pattern of data which initially populates the newly created file.

Figure 7:
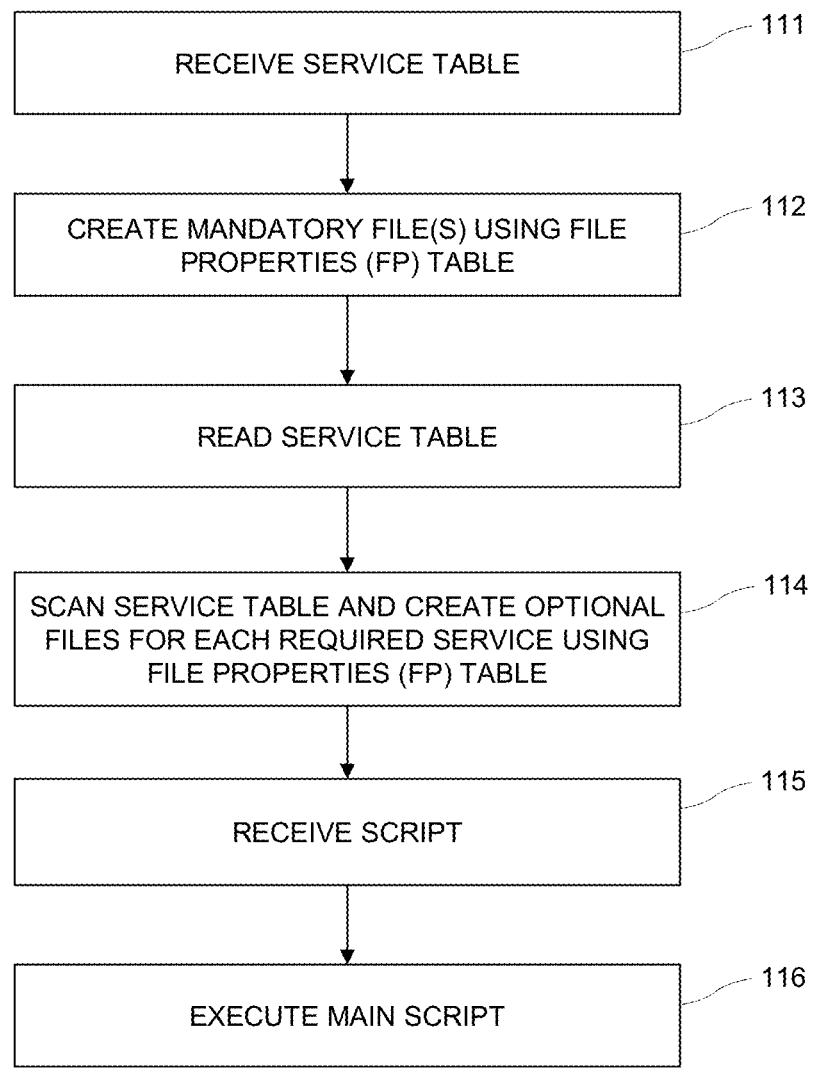
FIG. 7 shows another example of a method performed by a management application at an eUICC.

A second example of operation of the management application at the eUICC will now be described with reference to FIG. 7.

At block 111 a service table is received. The service table defines which service, or services, are required for the profile to be provisioned. The service table can be sent in a script before the main script for provisioning a profile. The service table script contains just one command, INSTALL INSTALL, which includes the service table in its parameters. A service table (ST) comprises an array of logical values: true or false. The services are numbered from 1 to n, for example. If a service i is present in the associated profile, then the value of ST[i] is set to true. An example service table can take the form:
  Service n° 1: Local Phone Book
  Service n° 2: Fixed Dialling Numbers (FDN)
  Service n° 3: Extension 2
  Service n° 4: Service Dialling Numbers (SDN)
  Service n° 5: Extension3
  Service n° 6: Barred Dialling Numbers (BDN)
  Service n° 7: Extension4
  Service n° 8: Outgoing Call Information (OCI and OCT)
  Service n° 9: Incoming Call Information (ICI and ICT)
  Service n° 10: Short Message Storage (SMS)
  Service n° 11: Short Message Status Reports (SMSR)
  Service n° 12: Short Message Service Parameters (SMSP)
  Service n° 13: Advice of Charge (AoC)
  Service n° 14: Capability Configuration Parameters 2 (CCP2)
  Service n° 15: Cell Broadcast Message Identifier
  Service n° 16: Cell Broadcast Message Identifier Ranges
  Service n° 17: Group Identifier Level 1
  Service n° 18: Group Identifier Level 2
  Service n° 19: Service Provider Name
  Service n° 20: User controlled PLMN selector with Access Technology
  Service n° 21: MSISDN
  Service n° 22: Image (IMG)
  Service n° 23: Support of Localised Service Areas (SoLSA)
  Service n° 24: Enhanced Multi Level Precedence and Pre emption Service
  Service n° 25: Automatic Answer for eMLPP
  Service n° 26: RFU
  Service n° 27: GSM Access
  Service n° 28: Data download via SMS-PP
  Service n° 29: Data download via SMS CB
  Service n° 30: Call Control by USIM
  Service n° 31: MO-SMS Control by USIM
  Service n° 32: RUN AT COMMAND command
  Service n° 33: shall be set to '1'
  Service n° 34: Enabled Services Table
  Service n° 35: APN Control List (ACL)
  Service n° 36: Depersonalisation Control Keys
  Service n° 37: Co-operative Network List
  Service n° 38: GSM security context
  Service n° 39: CPBCCH Information
  Service n° 40: Investigation Scan
  Service n° 41: MexE For example, if service number 19 is present (Service Provider Name), the file EFspn shall be created.

At block 112 the management application of the eUICC creates mandatory files. Mandatory files are independent of any particular service and are needed for any created profile. FIG. 8 shows an example of a FP table 60 which includes file properties for mandatory files and optional files. The mandatory files are indicated by a service number (Service #)=0. The management application uses the FP table to create the mandatory files, by looking for services with service #=0.

In addition to the mandatory files required by every profile, some services require one or more additional files. The management application at the eUICC implements a data structure, FP 60, that stores, for each service, the parameters required to create these additional files. These parameters include at least: file identity, access rights, and size. The FP table includes a Service number (Service #) value per entry. They may be held, for example, in variable length records, with one record for each service. Each record holds the identities and parameters of all the files required for a given service. Alternatively, the FP table 60 may hold multiple records per service, with each record identified by the same value of service #. The order of blocks 111 and 112 may be reversed. At block 113 the service table received at block 111 is read. At block 114 the optional files are created by scanning the service table and creating an array:

for i=1 to n
  if ST[i]
    create files for all records in FP where service #=i;

Following block 114, the management application at the eUICC has now created all, or most of, the files that are required to provision a profile. At block 115 a script is received at the eUICC. The script can have the same form as shown in FIG. 4, i.e. with CREATE FILE entries replaced with SELECT file entries. The script may be received earlier than shown in FIG. 7, such as before block 111, or at any point before the script is executed. At block 116 the main script is executed. Referring again to the script of FIG. 4, consider the management application reads entry 46 in the script 45. Entry 46 refers to a file with identifier 2F06. The file with identifier 2F06 will already have been created by the preceding process at block 112 or 114 using the file properties table 50.

Note that in either of the examples described above, the script 45 may include at least one file creation command. For example, it may be necessary to create a proprietary file whose existence cannot be deduced either from the standards or from the service table, and which it is still necessary to explicitly define in the script sent to the eUICC.

The following specifications define files required during the provisioning process:

for a USIM (UMTS—Universal Mobile Telecommunications System—SIM): 3GPP 31.102
for a SIM (Subscriber Identity Module): 3GPP 51.011
for an iSIM (IMS—IP Multimedia Subsystem—SIM): 3GPP 31.103
for a CSIM (CDMA SIM): 3GPP2 C.S0065-0

Using these specifications, it is possible to define a list of mandatory files for a given profile and to populate the data structure FP 50, 60.

Using the service table and the appropriate specification, it is possible to complete the list of mandatory files with the optional files (optional from the point of view of the specification) that are needed to implement all the services offered by each of the network access applications included in the profile.

In the example described above, properties of mandatory files and optional files are stored together in one data structure FP. Entries in the data structure have a service #field. A value of the service #=(1 . . . n) indicates an optional file associated with that service. A value of the service #=0 indicates a mandatory file. A mandatory file can be indicated by any other suitable value of service #, such as a negative value (e.g. −1) or any positive value outside the expected range (1 . . . n) used in the service table. An alternative to storing file properties in a single data structure is to store a data structure for mandatory files and to store a separate data structure for optional files.

Figure 9:
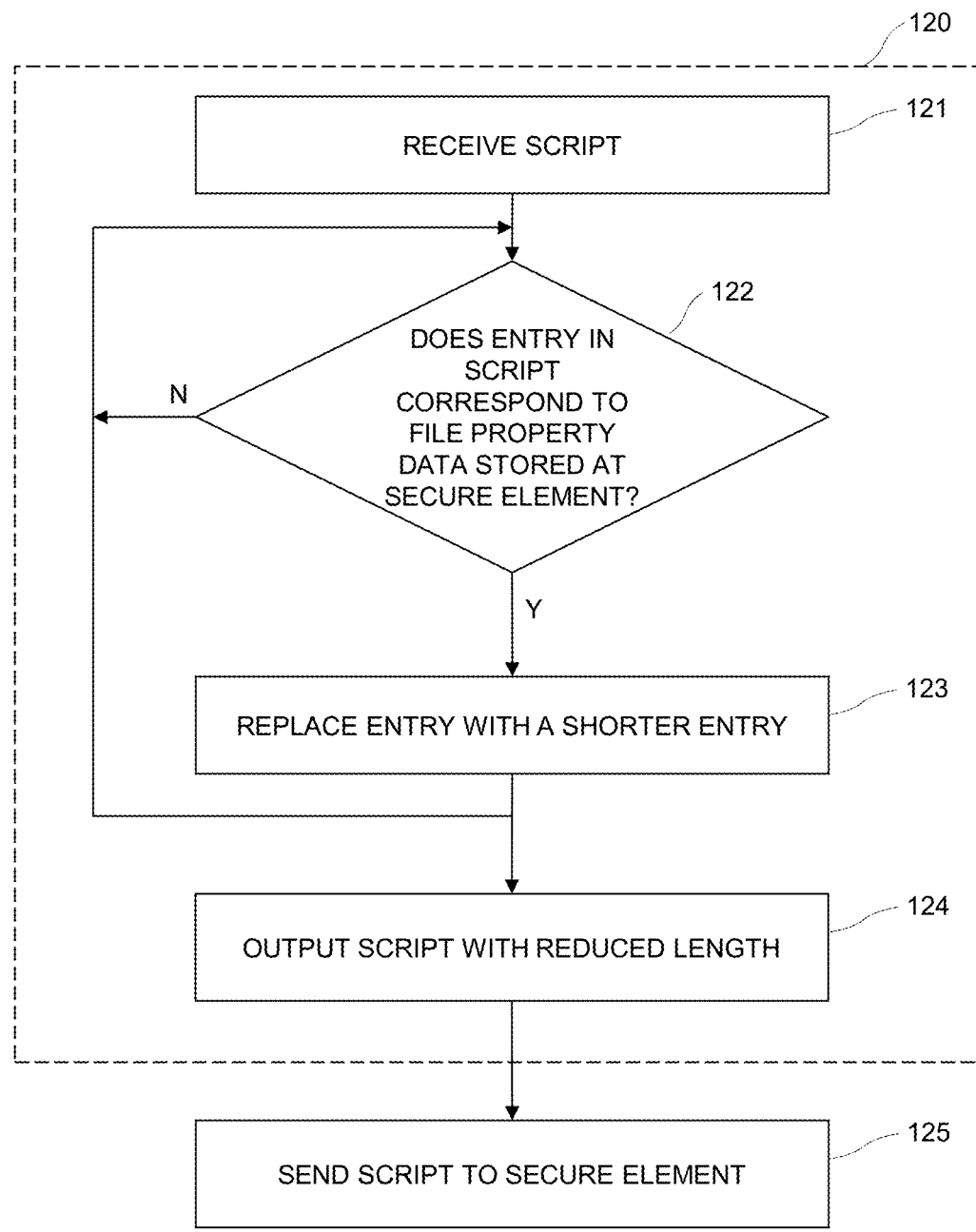
FIG. 9 shows a method of preparing a script for provisioning a profile.

FIG. 9 shows a method performed at a sending entity, such as the SM-DP 10. The SM-DP knows that the eUICC has a local store of file property data which will allow the eUICC to create certain files. The method comprises a block 120 of preparing a script to remotely provision a profile at a secure element. A script mat be created from a specification file which defines the actions to be performed by the script. Alternatively, the method can be performed to process or "filter" an existing script. By processing the existing script, the method can reduce the length of the script. The existing script may take the form of the script shown in FIG. 3, which has create file commands. FIG. 9 shows additional detail of block 120 for the case where an existing script is processed. Block 121 receives a script to provision a profile. The script may be a conventional script which includes file creation commands. Block 122 identifies a first entry in the script which comprises a command to create a file, the file corresponding to a file held in the local store of file property data at the secure element. Block 123 replaces the first entry in the script with a second entry in the script. The second entry is shorter than the first entry and lacks the command to create the file. As described above, the second entry can comprise a SELECT FILE command. This maintains compatibility with a conventional script while reducing the script size. Block 124 outputs a modified script which has a shorter length compared to the script received at block 121. Block 125 sends the script to the secure element. As shown in FIG. 2, the path to the secure element may include an SM-SR 12.

In the examples described above a CREATE FILE command is replaced with a SELECT FILE command. In other examples, a CREATE FILE command can be replaced with a different command. This can be a proprietary command or reserved value, which is recognisable by the eUICC. Advantageously, the commands used in the modified script are compatible with ISO 7816.

Figure 10:
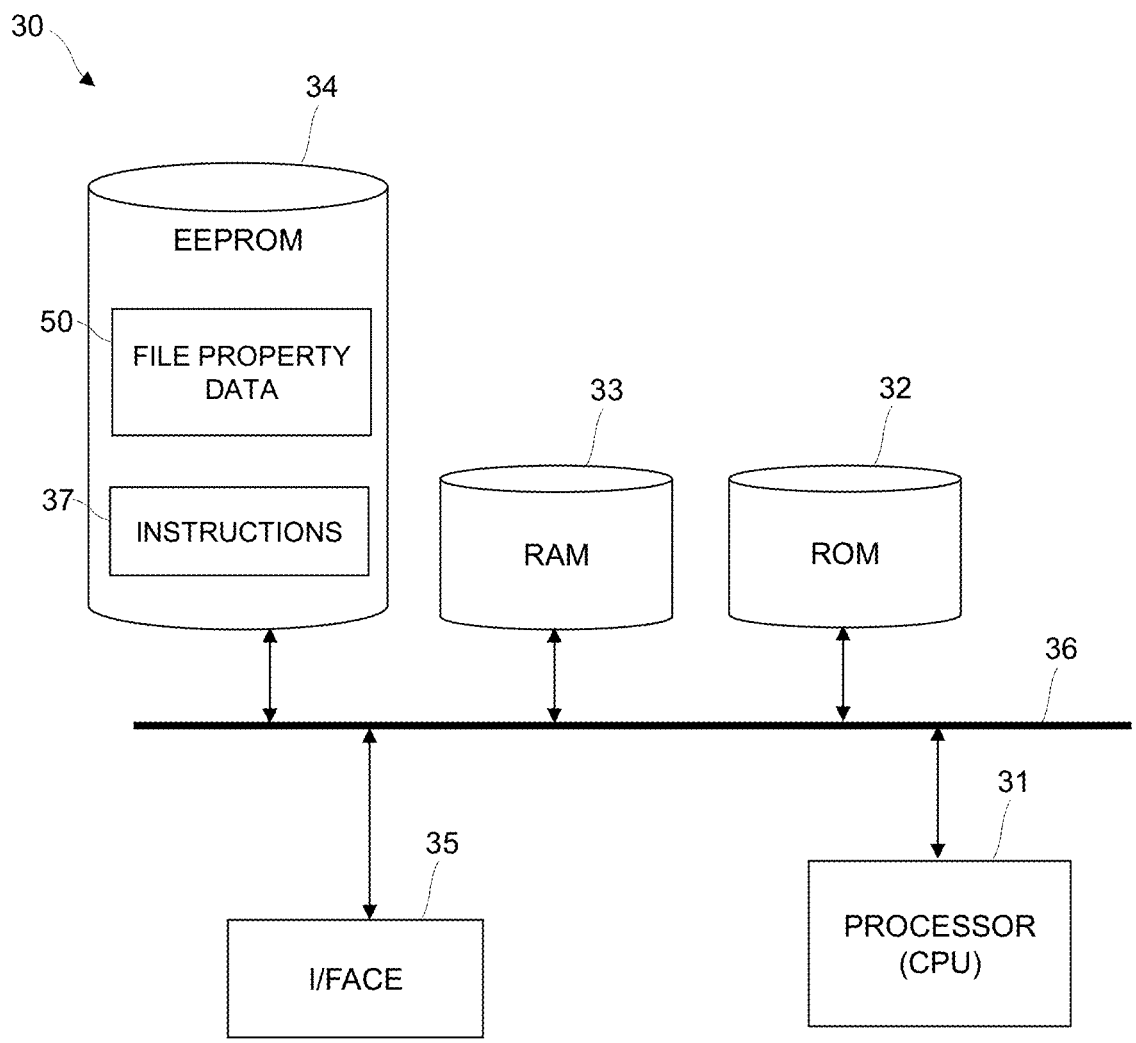
FIG. 10 shows an example of apparatus at a eUICC.

FIG. 10 shows an example of an eUICC 30. The eUICC 30 comprises a chip (integrated circuit) having a processor (CPU) 31 and storage. The storage can comprise read only memory (ROM) 32, random access memory (RAM) 33 and non-volatile re-writable memory 34, such as Flash memory. One or more buses 36 communicatively couple functional units 31-35 of the eUICC.

The processor 31 may be a microcontroller, microprocessor or any other suitable type of processor for executing instructions. Processor-executable instructions 37 can be stored in ROM 32 and/or Flash memory 34. The processor-executable instructions 37 can include a management application for remotely providing a profile. An interface 35 supports communication between the device 30 and the host device 20. Memory 34, or ROM 32, can store file property data 50 which is used to locally create files at the secure element.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of preparing a modified script to send to a secure element to remotely provision a profile at the secure element, the method performed at a sending entity having a processor and a memory containing instructions executed by the processor, the secure element having a local store of file property data corresponding to parameters for create file commands, the method comprising:
   receiving a service table indicating at least one service required by the profile, the local store of file property data including an indication of a service with which the file property data is associated;
   using the received service table to identify a service required for the profile;
   retrieving file property data from the local store of file property data for each required service;
   creating at least one file for the required service using the retrieved file property data;
   receiving, by the processor, an initial script comprising a create file command to create a file;
   determining, by the processor, whether or not the create file command corresponds to the created at least one file using the file property data stored in the local store of file property data at the secure element;
   replacing, by the processor, the create file command with a select file command to select the at least one file to create a modified script when the create file command corresponds to the at least one file using the file property data, the modified script lacking the create file command;
   outputting, by the processor, the modified script, the modified script having a length that is shorter than a length of the initial script;
   executing the modified script to provision the profile.

2. The method according to claim 1, wherein the modified script comprises a second entry which identifies the at least one file, the second entry having a shorter length than a first entry which includes the create file command.

3. The method according to claim 1, wherein the initial script comprises a first entry which comprises the create file command to create the file, and
   the method further comprises:
      determining, by the processor, whether or not the first entry in the initial script corresponds to the at least one file using the file property data stored in the local store of file property data at the secure element; and
      replacing the first entry in the initial script with a second entry in the initial script to create the modified script when the first entry is determined to correspond to the at least one file using the stored file property data, the second entry being shorter than the first entry and lacking the create file command.

4. The method according to claim 3, wherein the first entry comprises the create file command, a file identifier, and file properties, and
   the second entry comprises the file identifier.

5. The method according to claim 3, wherein the second entry comprises the select file command.

6. The method according to claim 1, wherein the file property data comprises at least one of the group consisting of: a file identifier, a file size, and file access rights.

7. The method according to claim 1, wherein the create file command and the select file command in the initial script and the modified script conform to International Organization for Standardization ("ISO") 7816.

8. The method according to claim 1, wherein the secure element is an embedded Universal Integrated Circuit Card.

* * * * *